May 11, 1937.  M. P. BLOMBERG  2,079,748
MOTORCAR
Filed Oct. 18, 1934  8 Sheets-Sheet 1
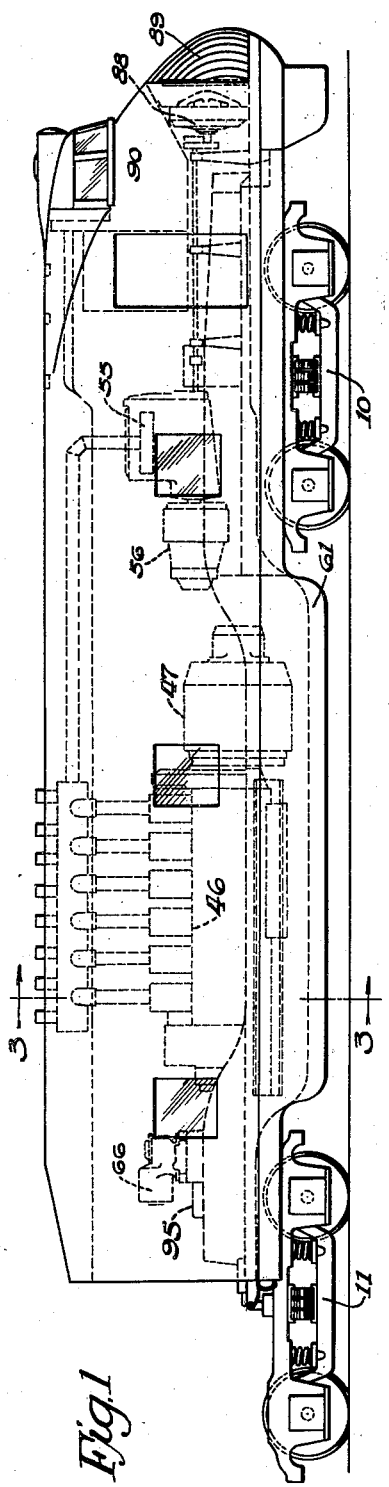
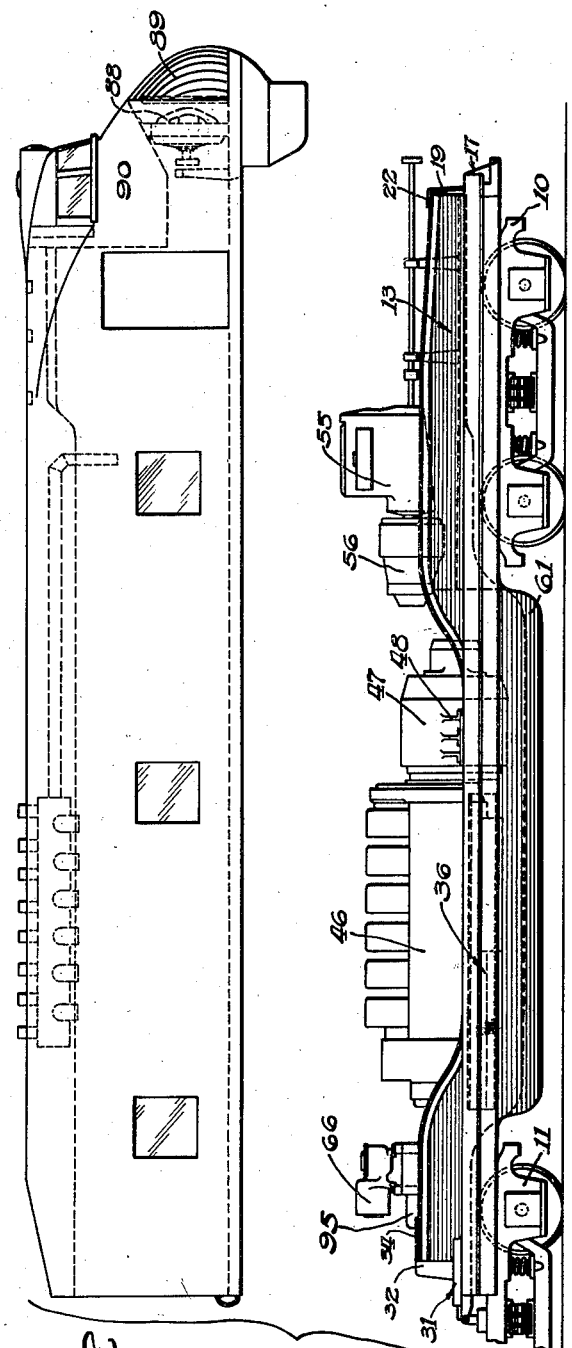
Fig.1
Fig.2
Inventor
Martin P. Blomberg
By Wilson, Mann & Cox,
Attys.

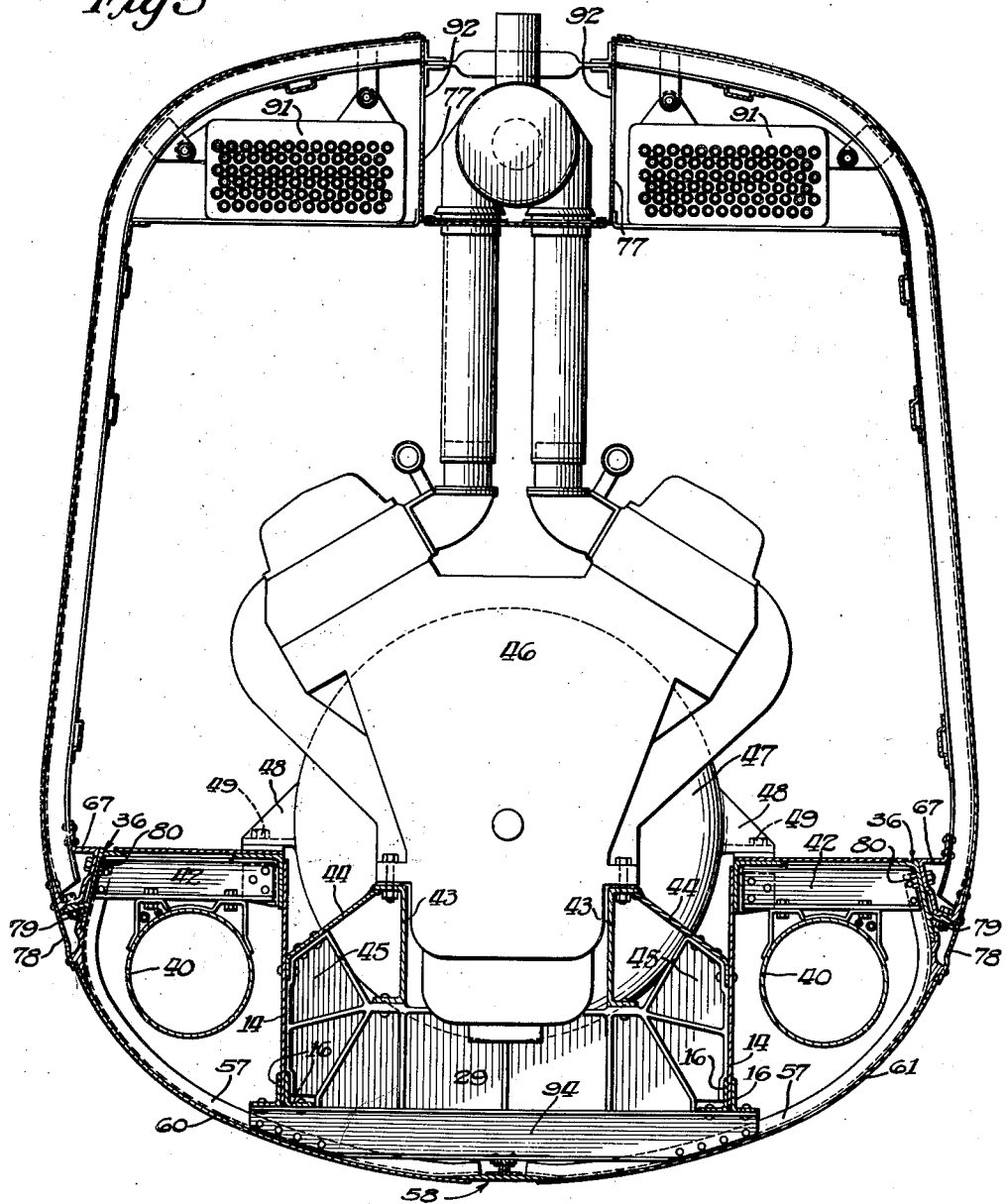

May 11, 1937.   M. P. BLOMBERG   2,079,748
MOTORCAR
Filed Oct. 18, 1934   8 Sheets-Sheet 3
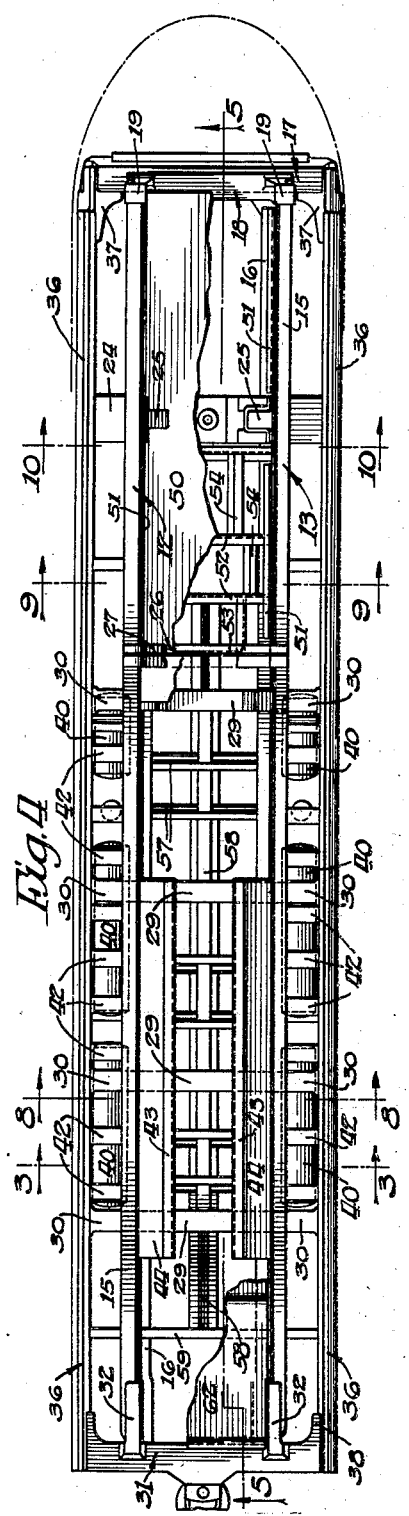
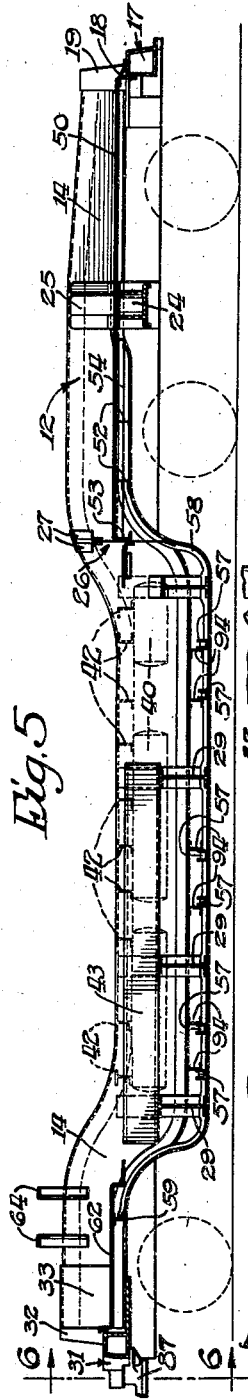
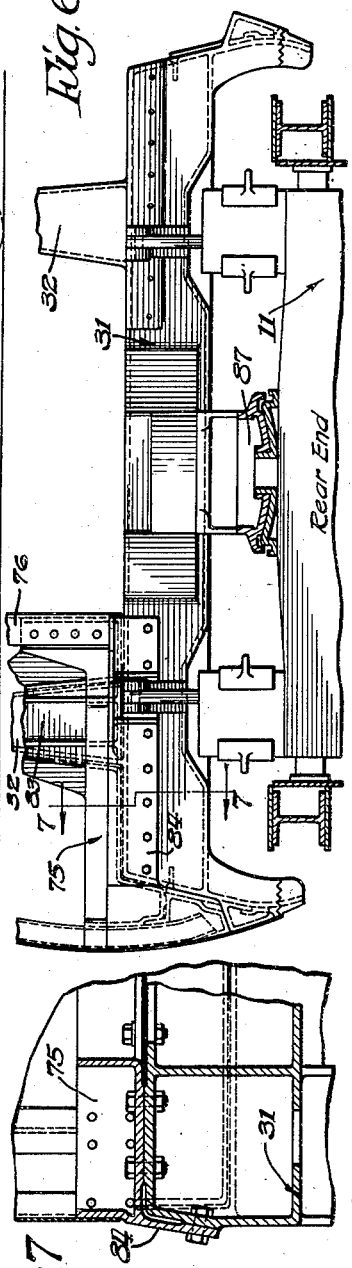
Inventor
Martin P. Blomberg
By Wilson, Mann & Cox,
Attys.

May 11, 1937.　　　M. P. BLOMBERG　　　2,079,748
MOTORCAR
Filed Oct. 18, 1934　　　8 Sheets-Sheet 4

Inventor
Martin P. Blomberg
By Wilson, Mann & Co
Attys.

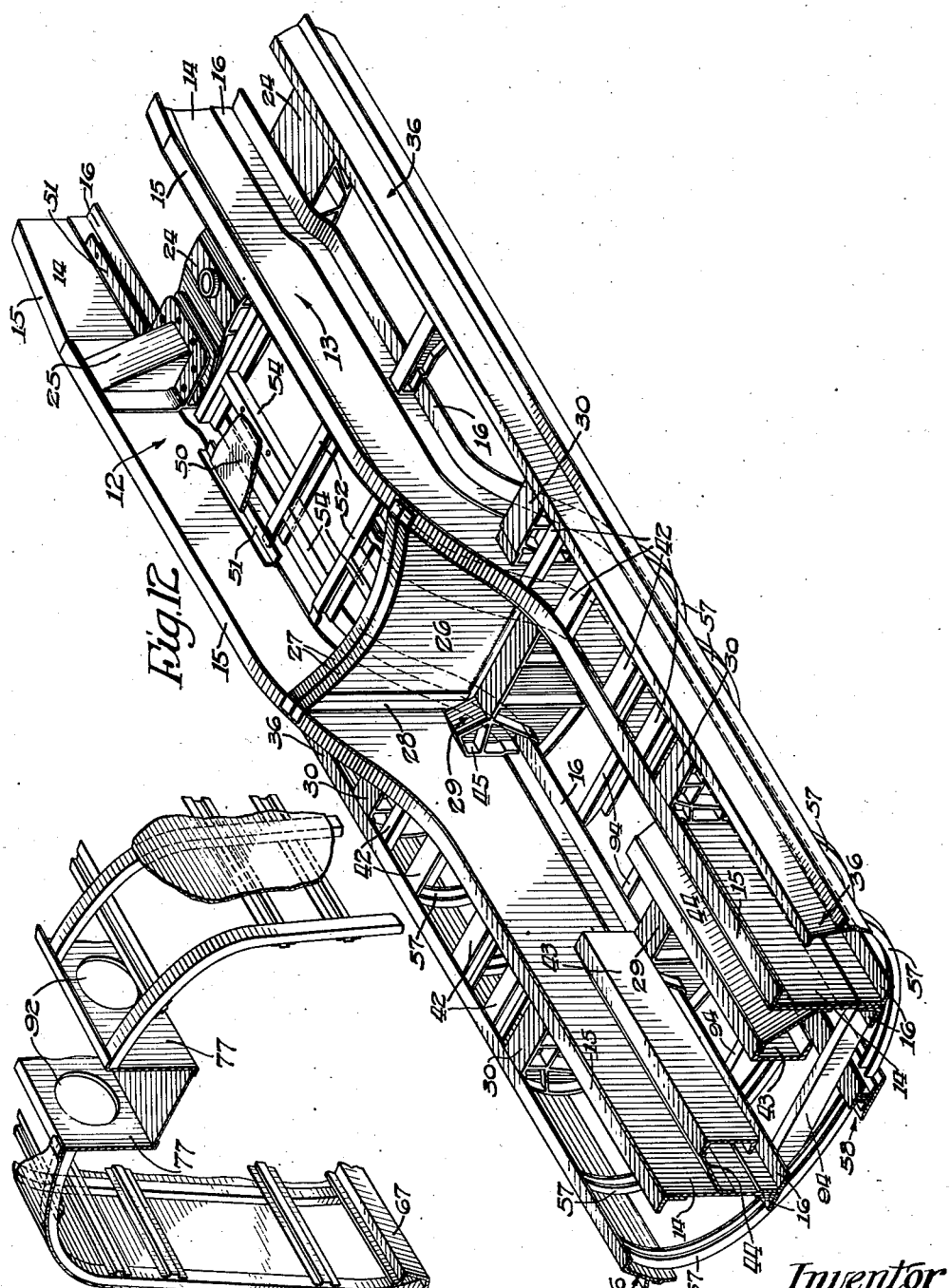

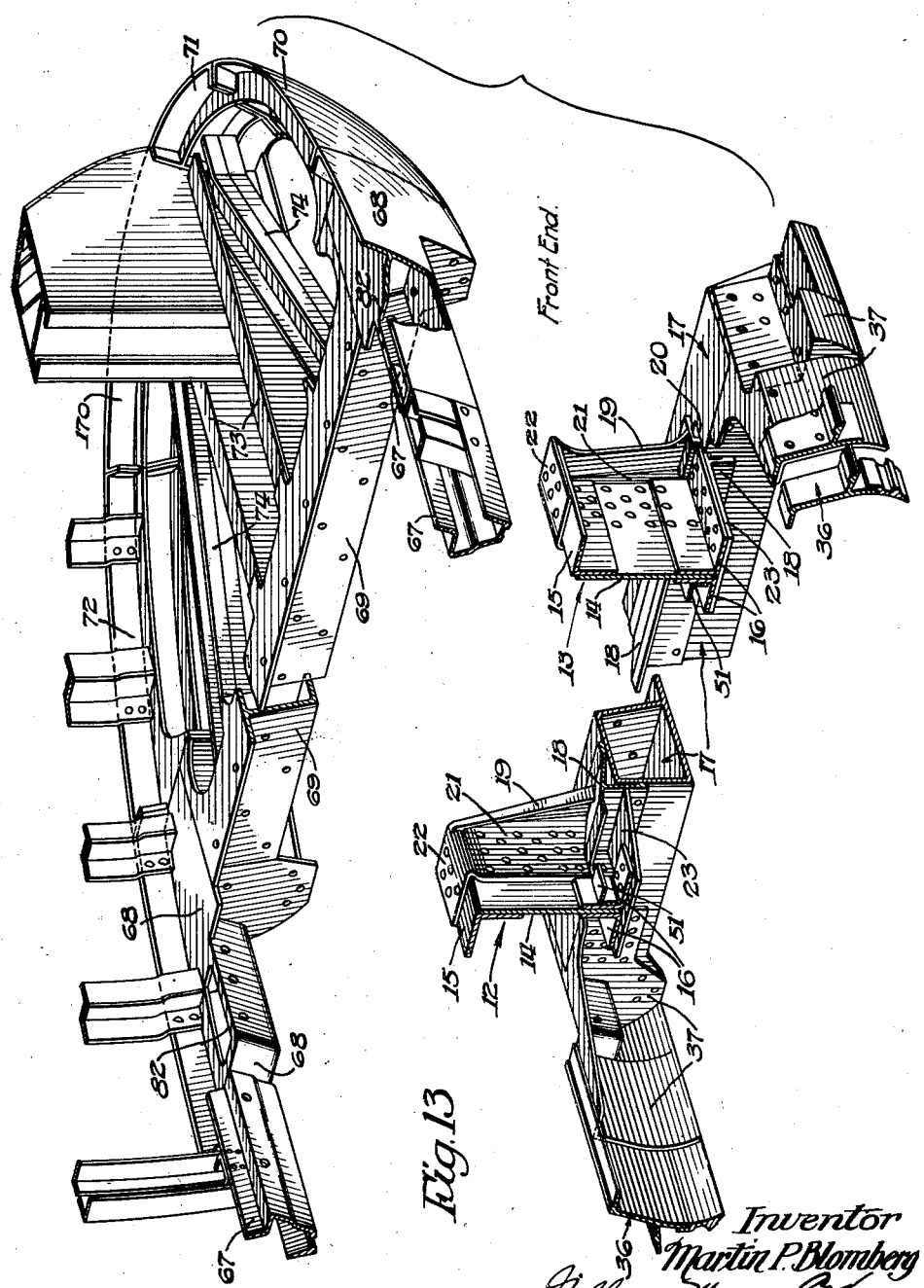

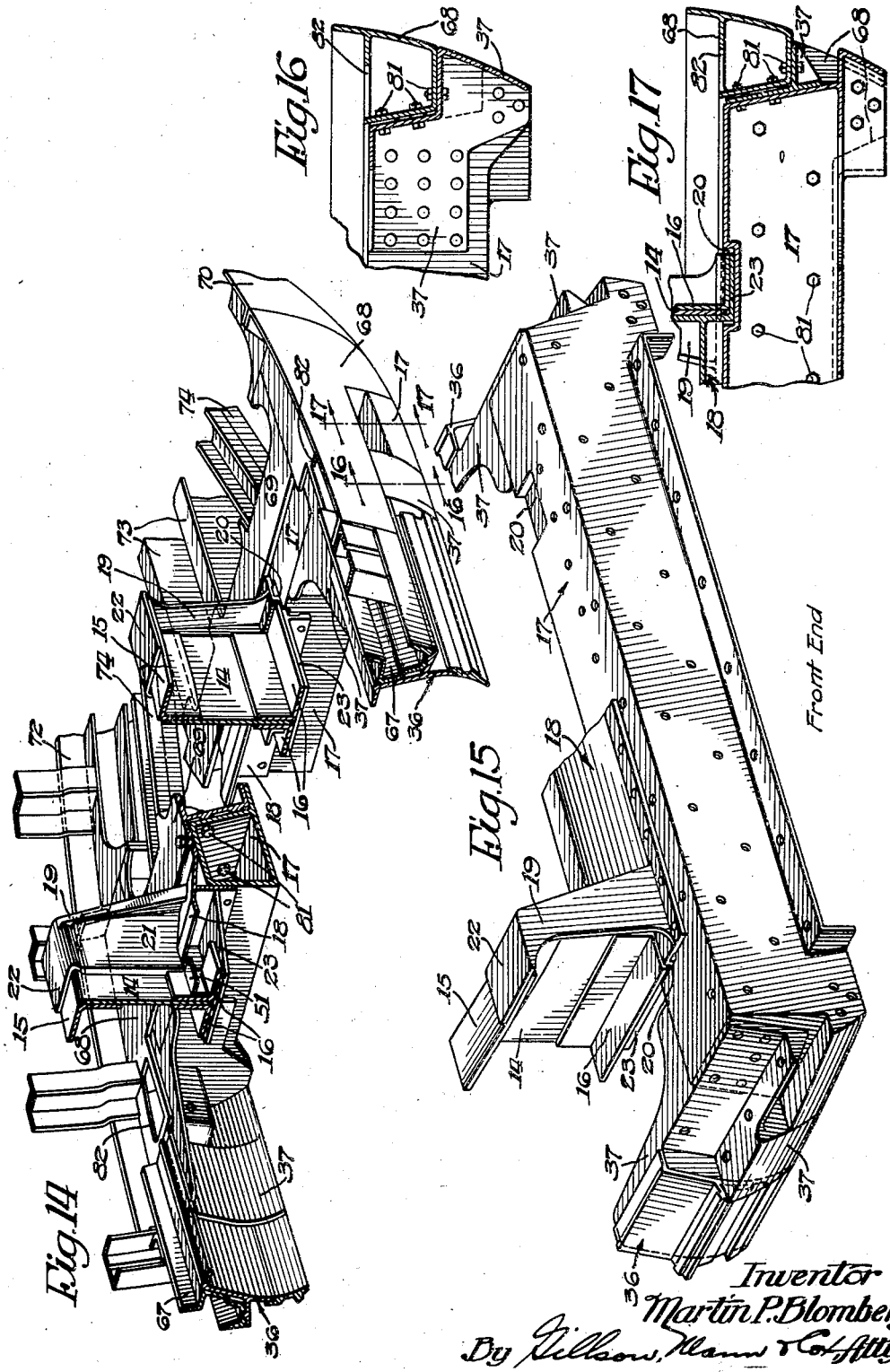

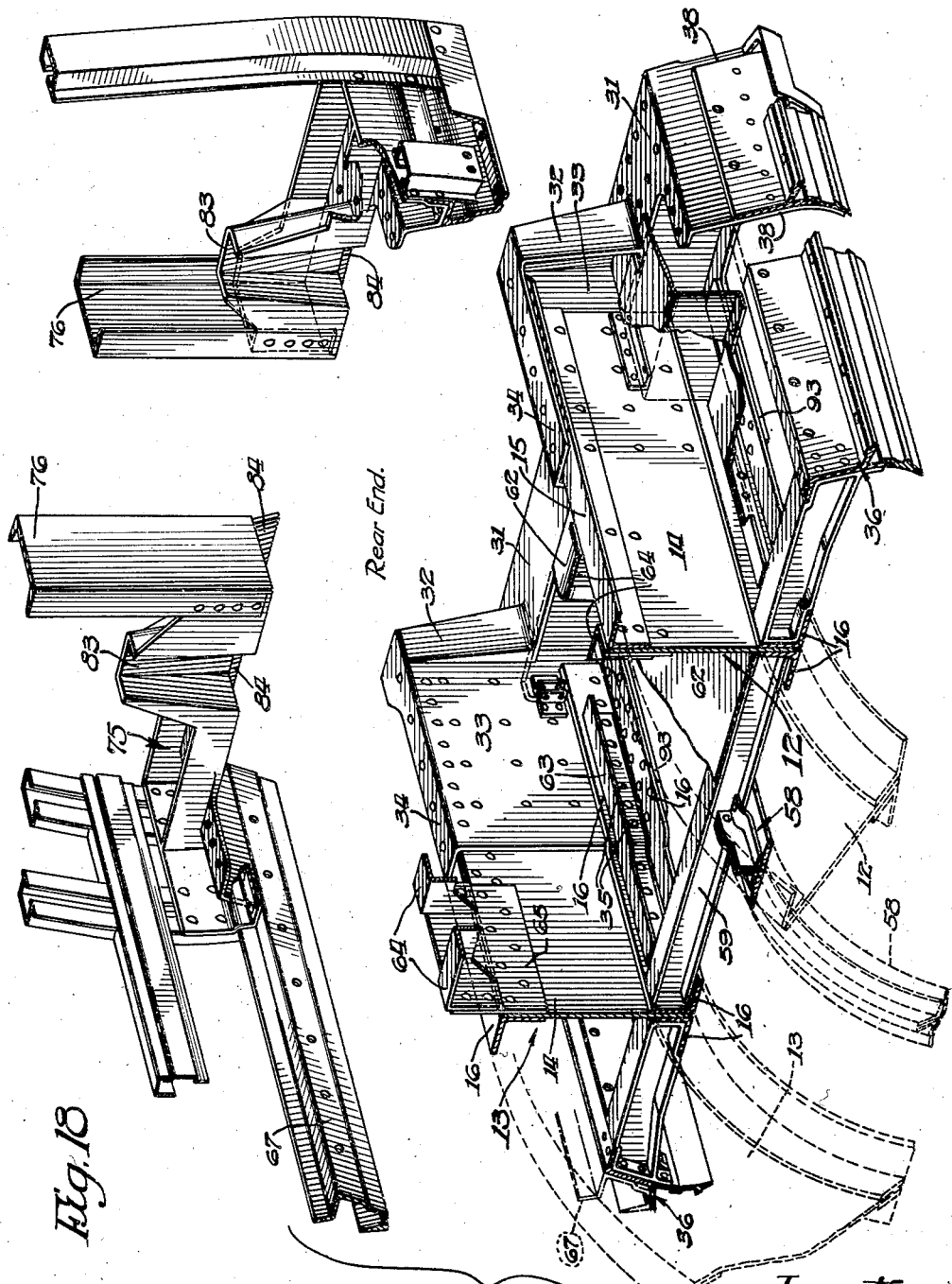

Patented May 11, 1937

2,079,748

UNITED STATES PATENT OFFICE 2,079,748

MOTORCAR

Martin P. Blomberg, Chicago, Ill., assignor to Pullman-Standard Car Manufacturing Company, Chicago, Ill., a corporation of Delaware Application October 18, 1934, Serial No. 748,877

7 Claims. (Cl. 105—414)

This invention relates to self-propelled cars, and has for its principal objects to lower the center of gravity of the power plant (and the car as a whole) and properly distribute the weight on the driving wheels; to provide ready access to all parts of the plant for inspection and repair; and to provide an improved car frame especially adapted to carrying large power plants.

Further objects and advantages of the invention will appear from the description taken in connection with the accompanying drawings, in which—

Fig. 1 is a side elevation of the power section of an articulated car embodying the invention;

Fig. 2 is a similar side elevation with the house body raised to expose the various parts of the power plant;

Fig. 3 is a transverse section taken on the line 3—3 of Fig. 1;

Fig. 4 is a plan view of the frame with the power plant and house body removed;

Fig. 5 is a longitudinal section taken on the line 5—5 of Fig. 4;

Fig. 6 is a transverse section taken on the line 6—6 of Fig. 5 with a part of the house body shown at the left;

Fig. 7 is a longitudinal section on the line 7—7 of Fig. 6;

Figure 8:
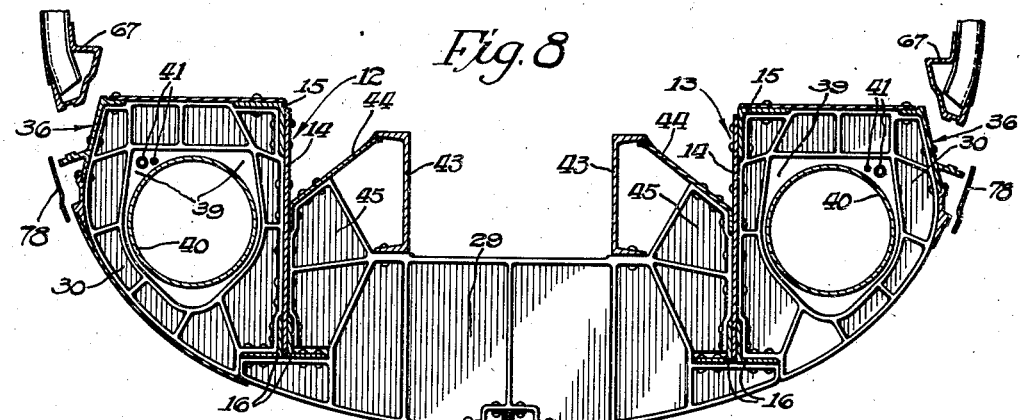
Figure 9:
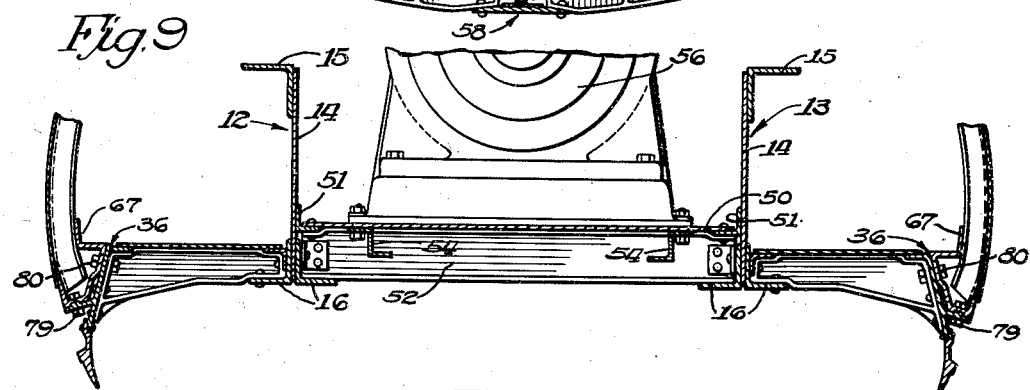
Figure 10:
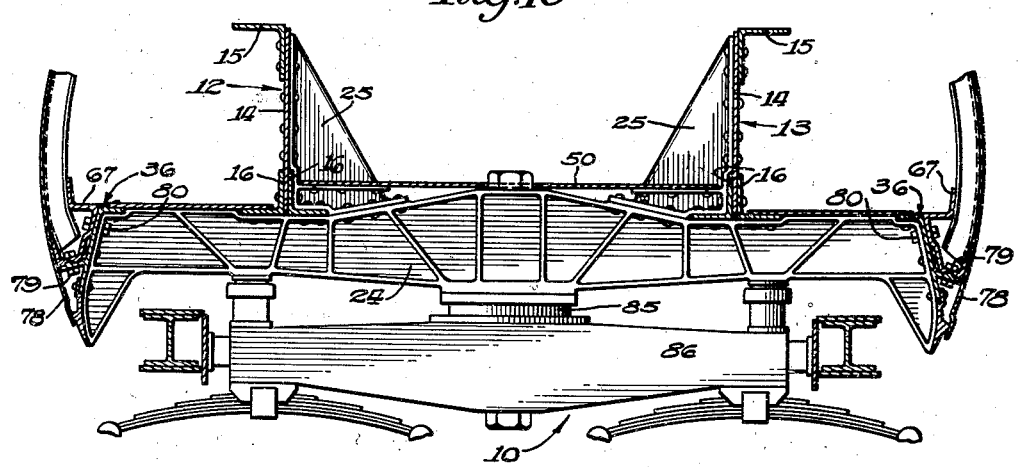

Figs. 8, 9 and 10 are transverse sections taken on the lines 8—8, 9—9, and 10—10 of Fig. 4, with fragments of the house body included to illustrate the relation between the parts;

Fig. 11 is a perspective view of a typical section of the house body;

Fig. 12 is a perspective view of approximately the front half of the under frame, the front end beyond the bolster being broken away;

Fig. 13 is a perspective view of the front end of the car showing a fragment of the house body raised above a fragment of the under frame;

Fig. 14 is a perspective view similar to Fig. 13 with the parts brought together to show their assembled relation;

Fig. 15 is a perspective view of the front end sill construction of the under frame;

Figs. 16 and 17 are sectional views taken on the lines 16—16 and 17—17 of Fig. 14;

Fig. 18 is a perspective view of the rear end of the car section showing a fragment of the house body raised above a fragment of the under frame.

But these specific illustrations and the description are used for that purpose only, and are not intended to impose unnecessary limitations on the claims.

This embodiment having been designed as the front or power section of an articulated car, the front end is supported on a lead truck 10 and the rear end is supported on an articulating truck 11, both trucks being driven and the load being approximately equal on each of the driving wheels.

The under frame is built around two main longitudinal sills 12 and 13, best shown in Fig. 12, in this instance made of aluminum, each comprising a web 14 (Figs. 8, 9, 10) with a single angle 15, above and two angles 16 below. At the front (Figs. 13, 15 and 17) the sills are connected by an end sill composed of a main box casting 17 and an auxiliary casting 18, riveted to it and provided with upstanding brackets 19, which receive the end portions of the main sills and are riveted to them.

As best shown in Fig. 17, the end sill casting has a recess 20, which receives the feet of the brackets 19, and forms with them an interlocking joint. The brackets include the upright web portion 21, and the overlapping flat portion 22, which are riveted respectively to the webs 14 and the top angles 15. The casting 18 also includes shelf brackets 23, which receive the lower angles 16 after the fashion of buttresses and to which they are riveted.

To the rear of the end sill the main sills are supported by a cast steel bolster 24 (Figs. 4, 5, 10, 12) to which they are braced by gusset brackets 25, also of cast steel (Fig. 12).

To the rear of the bolster 24 the main sills are connected by a fabricated cross sill of aluminum, including a web 26, top angles 27, and side angles 28. Between the two trucks the main sills are bent downwardly to form a drop, or depressed section, and in this area they are connected by four cast steel cross sills (Figs. 4 and 5), each composed of a main intermediate casting 29 (Fig. 8) and two side castings 30 riveted together and to the sills, as best shown in Fig. 8.

At the rear end, the main sills are connected by a rear end sill 31 (Fig. 18) of cast steel, having brackets 32 to receive the end portions of the main sills. Those brackets include long webs 33 and overlapping flat portions 34 riveted respectively to the webs 14 and the top angles 15. The lower portions of the webs 33 extend between the webs 14 and one of the lower angles 16, as best shown at the left in Fig. 18, and rivets 35 pass through both angles 16, the web 14 and the web 33. There are also ledges 93 on the rear end sill 31 supporting and riveted to the horizontal flanges of the angles 16.

The underframe also includes side sills 36 extending straight from one end sill to the other and formed of extruded aluminum sections, shaped and interlocked as best shown in Figs. 8, 9 and 10.

At their front ends the side sills 36 are riveted to wing castings 37 (Fig. 13) which, in turn, are riveted to the main end sill casting 17. At their rear ends the side sills are riveted to wing flanges 38 (Fig. 18) on the end sill casting 31. Between their ends the side sills are riveted to the cast steel cross sills, as best shown in Figs. 4 and 8, and to the bolster 24.

Each of the side castings 30 (Fig. 8) of the intermediate cross sills is provided with a large irregular opening 39 through which the tanks 40 (Figs. 4 and 8) and piping 41 are inserted lengthwise, from beneath the end portions of the under frame. The tanks are supported clear of the castings 30 by hangers fast to tank supports 42 (Fig. 3) fitted between and connected to the side sills and the main sills. They are of aluminum of the shape best illustrated in Fig. 5.

Two steel channel beams 43, riveted to three of the intermediate cross sills (Figs. 5, 8 and 12) have their upper ends welded to inclined plates 44, having their opposite edges between the arms 45 of the castings 29 and the webs 14, to both of which they are riveted.

These channel beams 43 form a bed for the main prime mover 46 of a 900 H. P. gas electric set, the direct-connected generator 47 of which is mounted on top of the main sills, as best shown in Figs. 2 and 3, where the supporting brackets 48 for the generator are secured to the sills by the bolts 49.

Over the front truck (Figs. 5, 9 and 10) there is a bed plate 50, supported by the front end sill casting 18, angles 51 secured to the inner sides of the main sills above the bolster 24, and to cross and longitudinal frame members 52, 53 and 54, arranged between the bolster 24 and the cross sill 26. The plate 50 at once forms a floor and a bed plate for an auxiliary 60 kw. gas electric set 55, which is bolted to the frame members 52 and 53 with the generator 56 thereof projecting over the curved upper edge of the cross sill 26.

In the depressed or dropped section the side and main sills are connected by a plurality of ribs 57 (Figs. 4 and 12) which join at a central built-up beam structure, generally indicated at 58, and extending from the cross frame member 52 at the rear of the front truck to a similar cross frame member 59 just in front of the rear truck.

A plurality of cross supports 94 extend transversely of the car between the main sills 12 and 13 and the bottom beam 58, their ends being riveted to the ribs 57. These supports serve to transmit some of the engine load to the house body and particularly the car sides, which act as guides in taking the load.

Curved bottom sheets 60 and 61 secured to the ribs 57, the side sills and the center beam structure close the bottom of the drop section.

Between the main sills 12 and 13 at the rear (Fig. 5) is a plate 62 (Fig. 18) supported by the rear end sill 31, the cross frame member 59 and angle bars 63 (Fig. 18) riveted to the sills. This plate forms a bed for an air compressor 95 of fifty (50) cubic feet capacity, driven by an electrical motor receiving current from the auxiliary generator set 55.

Cross sills 64 (Figs. 5 and 18) secured to plate brackets 65 on the main sills, form a bed for an additional air compressor 66 of twenty-five (25) cubic feet capacity, also driven by an electric motor receiving current from the same source.

The location and arrangement of the main power unit, the auxiliary gas electric generator set, and the compressors materially assist in distributing the total weight substantially equally on each of the driving wheels.

The house body is very similar in shape and construction to that disclosed in my copending application Serial No. 717,420, filed March 26, 1934, except that the base frame is made to telescope with and be detached from the under frame heretofore described.

The base frame includes two side sills 67 of extruded aluminum sections, best illustrated in Figs. 8, 9, 10, 13 and 18. At their front ends they are interfitted with and riveted to wing castings 68 (Fig. 13) of steel, in turn interfitted with and riveted to a cross sill 69, also of cast steel. In front of the wing casting 68, are four aluminum castings 70, 71, 72 and 170, arranged to form a sort of parabolic frame of great strength, which is stayed against buffing stresses by steel buffing sills 73 of channel shape and diagonal braces 74 made of two aluminum channels, arranged back to back.

At the rear (Fig. 18) the sills 67 are each interfitted with and riveted to an end sill casting 75 of steel, from which rise steel posts 76 of channel section that extend up to and are riveted to the beams 77 which form the top ridge of the house body (Fig. 11).

In Figs. 8, 9 and 10 it will be seen that the side sills 36 of the under frame taper downwardly and outwardly to receive the side sills 67 of the base frame of the house body. In Fig. 8 the parts are shown slightly displaced; in Fig 9 they are shown in the positions they assume upon complete assembly, and in Fig. 10 strips 78 are shown covering the joints, and masking one set of bolts 79 by which the house body is secured in place. It will also be noted from this figure that the two sills have a sort of tongue and groove relation where the bolts 79 pass through them. This is to relieve them of shearing stress, which might result in enlarging the bolt openings and allowing destructive play. Other bolts 80 also secure the sills together, but are reached from the inside of the house body, whereas access to the bolts 79 can be had by removing the cover strips 78.

From Figs. 13, 14 and 15 it will be seen that the front end sill of the under frame composed of the castings 17 and 18 and the cross sill 69 of the house body with the wing castings 68, also have a telescoping relation contributing to stability and strength, and held together by bolts 81, some of which are accessible through hand holes 82 in the wing castings 68.

In Fig. 18 it will be seen that the end sill castings 75 at the rear have upwardly tapered sockets 83 adapted to telescope over the bracket 32 on the rear end sill casting 31 of the under frame, and they also have tapered side portions which, together with the side sills 67 telescope over outer and downwardly inclined faces on the wings 38 of the end sill 31, and are secured by both.

The castings 75 are also provided with flanges 84 (Figs. 6, 7 and 8 which overlap the inclined rear face of the sill 31.

The interlocking relation between the base frame of the house body and the under frame, together with the bolts, makes a very strong connection and at the same time the house body can be readily released and jacked up, or lifted by a crane, as indicated in Fig. 2, to permit easy access to all parts of the power plant.

Of course, it will be necessary to disconnect some parts of the mechanism which go with the house body, but a detailed description is deemed unnecessary.

The bolster 24 is equipped with a center plate bearing 85 to rest upon the center plate of the truck bolster 86 on the front truck 10 and the rear end sill 31 is provided with a center plate bearing 87 to cooperate with the similar bearing on the bolster of the articulating truck 11.

Should the invention be applied to cars or car sections not involving articulation the under frame at the rear would be equipped with a bolster and center plate for cooperation with the truck in the usual manner.

The cooling system for the power plant and auxiliary includes two fans 88 (Fig. 1) driven from the auxiliary gas electric set 55 and drawing air through grills 89, passing it beneath the operator's cab 90 into the house body where it sweeps over all the machinery and through the radiators 91 (Fig. 3) escaping at openings 92 in a trough formed by the beams 77.

The scheme of design and operation is substantially the same as that disclosed in the application of Adams, Stout, Mussey and Blomberg, Serial No. 717,424, filed March 26, 1934, to which reference is made for particulars.

I claim:

1. In a self-propelled car, a longitudinal frame comprising substantially straight side sills and intermediate sills, the latter being depressed between ends, a power plant borne by the intermediate sills on the depressed portions thereof, and a house body normally enclosing the power plant and detachable from the side sills to expose the plant for service and repair.

2. In a self-propelled car, a frame comprising spaced main longitudinal sills having their intermediate portions depressed, substantially straight side frame members, front and rear end sills extending from one side sill member to the other and rigidly connected thereto, means for rigidly connecting said end sills to said main sills, an engine bed mounted on the main sills on their depressed portions, an engine on the bed, a generator mounted on the main sills in line with and driven by the engine, and an auxiliary generator set adjacent to but spaced endwise from the generator.

3. In a self-propelled car, a pair of substantially straight side sills having outwardly extended ledges below their upper surfaces, a pair of main sills between said side sills and having their intermediate portions depressed, a power plant mounted on said depressed portions, end sills attached to the ends of said main and side sills and in the plane of said side sills, a house body having side walls telescoping said side sills and seated on said ledges, and means for holding said house body in telescopic relation to said side sills.

4. In a car, an underframe comprising end sills, side sills connecting the end sills and having their outer surfaces extending outwardly to form ledges and having surfaces inclined upwardly and inwardly, a house body supported by said ledges and provided with inclined surfaces for engaging said upwardly and inwardly inclined surfaces, tongue and groove connections between said ledges and ledge engaging portions of said house body, and means for securing said house body to said ledges.

5. In a self-propelled car, an underframe mounted on trucks and having its lateral edge portions inclined downwardly and outwardly, and a house body comprising a base frame in telescoping engagement with the underframe at said edge portions and detachably secured to said frame at said edge portions.

6. In a car, a substantially rectangular underframe comprising end sills, side sills connecting the end sills and having their outer surfaces extending outwardly to form ledges and having, throughout substantially their entire length, surfaces inclined upwardly and inwardly, a house body supported by said ledges and provided with inclined surfaces for engaging said upwardly and inwardly inclined surfaces, and means for securing said house body to said ledges.

7. In a self-propelled car, a frame comprising spaced main longitudinal sills having their intermediate portions depressed, substantially straight side sill members, means for rigidly joining the end portions of the main sills and the side sill members, and a power plant supported on the depressed portions of the main sills with the lower part of the plant projecting below the level of the side sills.

MARTIN P. BLOMBERG.